United States Patent
Richardson et al.

(10) Patent No.: US 6,905,532 B2
(45) Date of Patent: *Jun. 14, 2005

(54) PROCESS FOR THE DISSOLUTION OF COPPER METAL

(75) Inventors: Hugh W. Richardson, Sumter, SC (US); Gang Zhao, Sumter, SC (US)

(73) Assignee: Phibro-Tech, Inc., Ridgefield Park, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/704,155

(22) Filed: Nov. 10, 2003

(65) Prior Publication Data

US 2004/0191143 A1 Sep. 30, 2004

Related U.S. Application Data

(63) Continuation-in-part of application No. 10/074,251, filed on Feb. 14, 2002, now Pat. No. 6,646,147.

(51) Int. Cl.[7] .................................................. C07F 1/08
(52) U.S. Cl. ........................................ 75/711; 556/113
(58) Field of Search ............................ 75/711; 556/113

(56) References Cited

U.S. PATENT DOCUMENTS

| | | |
|---|---|---|
| 2,377,966 A | 6/1945 | Reed et al. |
| 3,375,713 A | 4/1968 | Edelstein |
| 3,929,598 A | 12/1975 | Stern et al. |
| 3,930,834 A | 1/1976 | Schulteis et al. |
| 3,936,294 A | 2/1976 | Childress |
| 4,324,578 A | 4/1982 | Seymour et al. |
| 4,578,162 A | 3/1986 | McIntyre et al. |
| 4,622,248 A | 11/1986 | Leach et al. |
| 4,808,407 A | 2/1989 | Hein et al. |
| 4,929,454 A | 5/1990 | Findlay et al. |
| 5,078,912 A | 1/1992 | Goettsche et al. |
| 5,084,201 A | 1/1992 | Greco |
| 5,186,947 A | 2/1993 | Goettsche et al. |
| 5,304,666 A | 4/1994 | McLain |
| 5,431,776 A | 7/1995 | Richardson et al. |
| 6,294,071 B1 | 9/2001 | Miller et al. |
| 6,484,883 B1 | 11/2002 | Edelstein |
| 6,646,147 B2 * | 11/2003 | Richardson et al. ........ 556/113 |
| 2004/0016909 A1 | 1/2004 | Zhang et al. |

FOREIGN PATENT DOCUMENTS

| | | |
|---|---|---|
| CA | 2262186 | 9/1999 |
| NZ | 334310 | 1/2001 |

* cited by examiner

*Primary Examiner*—Melvyn Andrews
(74) *Attorney, Agent, or Firm*—Morgan, Lewis & Bockius LLP (57) ABSTRACT

Process for producing a copper-containing aqueous solution, in which a copper mass is dissolved in the presence of an oxidant in an aqueous leach liquor containing monoethanolamine and $(HMEA)_2CO_3$. The leach liquor is produced by partially carbonating the monoethanolamine.

44 Claims, 7 Drawing Sheets

A Batch Dissolver

FIGURE 1

A Batch Dissolver

A Schematic for Continuous Production of the MEA Complex of Copper Solution

PROCESS FOR THE DISSOLUTION OF COPPER METAL

CROSS-REFERENCE TO RELATED APPLICATIONS

This application is a continuation in part of application Ser. No. 10/074,251 filed on Feb. 14, 2002, now U.S. Pat. No. 6,646,147 B2, the entire application of which is incorporated herein by reference for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

SEQUENCE LISTING

Not Applicable.

BACKGROUND OF THE INVENTION

1. Field of the Invention

The present invention relates to a process for the dissolution of copper metal. More particularly, the invention relates to a process for producing a copper-containing aqueous solution by dissolving copper in the presence of an oxidant in an aqueous leach liquor containing monoethanolamine and (monoethanolammonium)$_2$ carbonate (HMEA)$_2$CO$_3$.

2. Description of the Prior Art

It is known to employ copper-containing aqueous solutions as biocidal fluids, for example, for the pressure treatment of lumber and for water purification. Examples of such fluids and uses thereof may be found, for example, in U.S. Pat. Nos. 4,929,454 and 6,294,071. The copper-containing solutions may be formulated, for example, by dissolving copper in aqueous solutions containing alkyl amines or alkyl hydroxy amines, such as 2-hydroxyethylamine.

Alternatively, copper-containing solutions may be produced by reacting copper oxide with chromic acid and arsenous acid to produce a solution of the copper with chrome and arsenic. The solution is subsequently diluted with water and the resulting aqueous solution may be injected into wood under pressure.

This chromated copper arsenate ("CCA") is the primary additive used in the treatment of wood against termite and other biological infestation. Although the CCA is very effective, it has come under increased pressure because of the environmental concerns associated with chromium and arsenic.

A new generation of pesticide is now emerging that appears to be efficacious, and which relies on the use of copper (in larger quantities than in the CCA) in combination with other pesticidal components, such as quaternary amines, nitrosoamines, and triazoles. The copper is typically applied as a solution of the monoethanolamine complex of copper carbonate or borate. The commercial form of the copper concentrate usually contains about 100 to 130 g/l copper which is diluted with water prior to injection into the wood.

The copper complex is typically produced commercially by the dissolution of basic copper carbonate in a solution of monoethanolamine (MEA), followed by further carbonation or addition of boric acid. The reactions can be approximately represented by the following equations:

$$Cu(MEA)_{3.5}(OH)_2 + CO_2(\text{or Boric acid}) \rightarrow Cu(MEA)_{3.5}CO_3 + H_2O$$

The production of the copper carbonate precursor has its own production and raw material costs, and a brine waste is generated which gives rise to environmental concerns. A more efficient process might be to produce the complex without the aid of an isolated precursor. It is known from the prior art that ammonia and carbon dioxide in water can be used to dissolve copper metal with oxygen from air as the oxidant. This is represented by the following equation:

The reaction proceeds well and has been the basis for copper dissolution in several commercial facilities. However, if the ammonia is not initially carbonated, the kinetics are very poor which makes the process unattractive from a commercial standpoint.

A need exists for a more efficient process for producing copper-containing aqueous solutions, suitable for use in the wood-treatment industry. The present invention seeks to fill that need.

SUMMARY OF THE INVENTION

It has been discovered, according to the present invention, that it is possible to efficiently produce copper-containing solutions directly without initially producing or isolating a precursor such as copper carbonate. The present invention accordingly provides a process for producing a copper-containing aqueous solution, wherein a copper mass is dissolved in the presence of an oxidant in an aqueous leach liquor containing monoethanolamine and (monoethanolammonium)$_2$ carbonate (HMEA)$_2$CO$_3$, the leach liquor being produced by partially carbonating the monoethanolamine. According to the process, copper-containing solution may be produced in 48 hours or less, usually within about 8–12 hours or less, and more usually within about 8 hours or less.

BRIEF DESCRIPTION OF THE DRAWINGS

The present invention will now be described in more detail with reference to the accompanying drawings, in which.

DETAILED DESCRIPTION OF THE INVENTION

Figure 1:
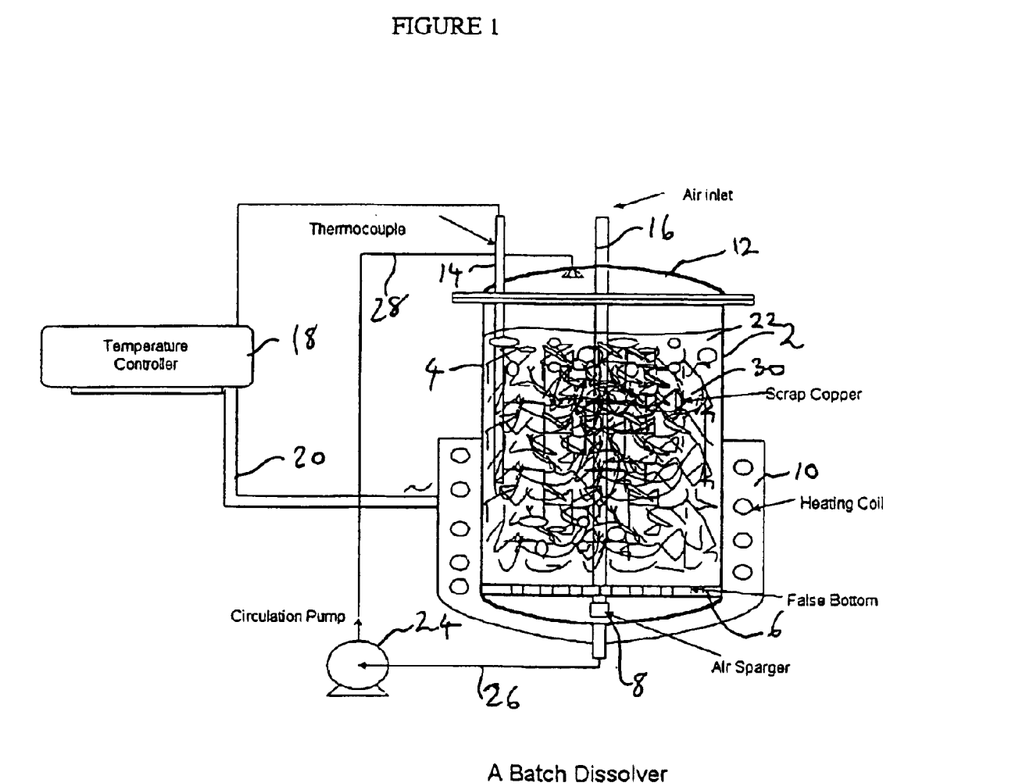
FIG. 1 is a schematic depiction of a batch dissolver to be used for performing the present invention in a batch-wise manner.

Referring to FIG. 1, there is shown a batch dissolver, generally referenced 2, having a chamber 4, with a false bottom 6, and an air sparger 8 located below the false bottom. The chamber is surrounded by a heating coil 10 and has a top 12 through which extend a thermocouple 14 and an air inlet 16. The thermocouple is connected to a temperature control unit 18 and supplies heat to the heating coil 10 through conduit 20. Leach liquor 22 is circulated through the chamber by circulation pump 24 through lines 26,28. Copper metal 30, typically scrap copper, is present in the chamber and immersed in the leach liquor to enable the dissolution to occur.

The term "copper" as used herein means copper metal, including scrap copper, such as for example copper wire, copper clippings, copper tubing, copper cabling and/or copper plate, compounds of copper, such as copper oxide, and/or mixtures of copper metal and copper compounds.

The term "copper mass" as used herein refers to copper metal in a form which, when present in the chamber, is permeable to the leach liquor and which presents high surface area for contact with the leach liquor to thereby expedite dissolution of the copper. The copper mass may be present for example as a three-dimensional open permeable network, such as a bale of scrap copper comprised of copper wire, copper tubing, copper cabling, copper plates, providing voids between the copper pieces to allow free flow and maximum contact of the leach liquor with the copper. A bale may have a volume of for example about 25–100 cubic feet. Alternatively, the copper mass may be present in the chamber as smaller irregular shaped pieces resembling "popcorn" ("blister shot") having an average dimension of about 1–3", which allow for good permeation of the leach liquor between and around the copper pieces to expedite dissolution thereof. The ratio of copper surface area to volume of leach liquor for this process (versus a standard agitated reactor) may reach about 200:1, more usually 10–20:1, for example about 15:1.

According to the process, the copper mass is dissolved in the presence of an oxidant in an aqueous leach liquor containing monoethanolamine and $(HMEA)_2CO_3$. Typically, for a 1 liter chamber, the air flow SCFH ranges from about 2–20, for example 3–10. The air flow SCFH will increase as the volume of the chamber increases. For example, for a chamber having volume in the region of 11,500 gallons, the SCFH will be in the range of 12,000 to 24,000.

The leach liquor is produced by partially carbonating the monoethanolamine and may be generated externally of the dissolver or in situ in the chamber through addition of for example carbon dioxide to the monoethanolamine/water solution by sparging or bubbling into the chamber. Usually, the leach liquor is produced externally of the chamber and introduced into the chamber into contact with the copper as required, or re-circulated as necessary.

The equation that represents the overall reaction is as follows:

$$Cu+3.5MEA+(1-x)CO_2+0.5O_2+xH_2O \rightarrow Cu(MEA)_{3.5}(CO_3)_{(1-x)}(OH)_{2x}$$

The equation that represents the in situ or external partial carbonation of the monoethanolamine is as follows:

$$3.5MEA+CO_2+H_2O \rightarrow 1.5MEA+(HMEA)_2CO_3.$$

The term ":partially carbonating" as used herein means that the amount of carbon dioxide introduced during the process is controlled such that partial carbonation occurs to form $(HMEA)_2CO_3$. Preferably, the carbon dioxide is present in an amount of about 30% or less by weight, more preferably, for example from about 0.5–5% by weight.

The MEA is usually present in an amount of about 30–45 wt %, more usually 32–40 wt %. A typical finished aqueous leach solution comprises about 36–40 wt % MEA and about 8–12% by weight carbon dioxide.

The monoethanolamine complex of copper carbonate solutions are typically prepared by dissolving the copper mass in a monoethanolamine/$CO_2$/$H_2O$ solution. The dissolution may be carried out in a batch dissolver (see FIG. 1), or may be performed as a continuous process in towers packed with copper (see FIG. 4). Typically, the copper and MEA/$CO_2$/$H_2O$ solution are charged into the dissolver, and the circulation pump, air-flow and temperature controller are actuated. Examples of conditions are given in Table 3 below.

The present inventors have discovered that it is not necessary to utilize precursors, such as copper carbonate which is expensive. The dissolution of the copper metal may be achieved in the presence of MEA, $(HMEA)_2CO_3$ and an oxidant at elevated temperature, without the need for the addition of ammonium compounds such as ammonium hydroxide, fungicidal anions, polyamines, carboxylic acids, alkali metal hydroxides such as sodium hydroxide, and/or alcohol-based solvents.

The dissolution of the copper metal is performed in the presence of an oxidant. Typically the oxidant is an air and/or oxygen, most usually air sparging.

While not essential, the leach solution may be re-circulated in the reactor to benefit mass transfer and reaction rate. If re-circulation is performed, typically the re-circulation is carried out at a constant rate, and may be, for example, a constant rate of about 2 to 10% by volume of the leach solution volume per minute.

The process may be carried out at atmospheric pressure and at a temperature of 25–100° C., for example 40–80° C., more usually 45–65° C. Typically, the temperature is maintained at 45–55° C.

The pH is typically maintained in the basic region, i.e. greater than 7, for example 8–13, usually greater than 9.0 and less than 12.5, more usually from about 9.5–12.5. The pH is usually maintained by addition of carbon dioxide as acid to lower pH, or as MEA as base to raise pH.

The reaction proceeds slowly where there is a small surface area of copper available to contact the leach solution. For example, if the contact area of the copper metal to leach solution is doubled, the rate of the process doubles assuming adequate air-distribution.

It has been found that an aerated packed tower containing copper metal and circulating leach liquor is the most preferred method for commercial purposes. The advantage of using a packed tower is that it maintains a relatively high surface area to solution volume of copper metal.

According to another embodiment of the present invention, it is possible to utilize a reactor that contains a bed of copper and can be rotated while being heated and aerated.

Figure 4:
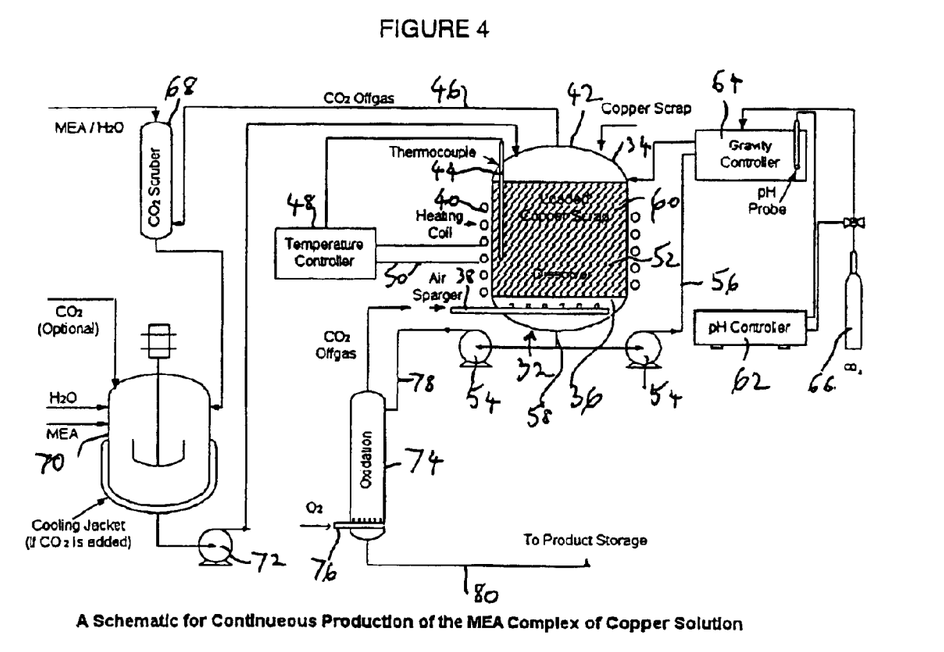
FIG. 4 is a schematic for continuous production of MEA complex of copper solution.

Dissolving studies were conducted either batch-wise or continuously. FIG. 1 shows a conventional batch dissolver used for the batch-wise operation. FIG. 4 shows a continuous dissolution process. The typical conditions used in the batch experiments are given in Table 1. The temperature was maintained at 45–55° C.

TABLE 1

Leach Solution

| EXP. # | ID | Amine, % | $CO_2$, % | Volume, ml | Cu Charge, g |
|---|---|---|---|---|---|
| 1 | MEA-$CO_2$ solution | 36.7 | 12 | 600 | 400 |
| 2 | MEA-$CO_2$ solution | 35.9 | 13 | 200 | 200 |

The leach solutions are typically re-circulated in the reactor. Most typically, the re-circulation is carried out at a constant rate of about 2–10% by volume.

The solution concentration of copper (g/l) as a function of dissolution time is shown in Table 2:

TABLE 2

| | Dissolution Time, hour | | | | | | | |
|---|---|---|---|---|---|---|---|---|
| EXP. # | 1 | 2 | 3 | 4 | 5 | 6 | 7 | 8 |
| 1 | 3.7 | 15.7 | 41.3 | 67.8 | 88.2 | 100.3 | | |
| 2 | 5.4 | 16.8 | 55.7 | 85.1 | 102.5 | 119.2 | 126.4 | 136.1 |

In experiments 1 and 2 reported above, average copper dissolution rates of about 17 g/l-hr were achieved over the course of the experiments. At those rates, the process is viable commercially.

FIG. 4 is a schematic for the continuous production of MEA complex in solution. The dissolver, generally referenced 32, has a chamber 34, with a false bottom 36, and an air sparger 38 located below the false bottom. The chamber is surrounded by a heating coil 40 and has a top 42 through which extend a thermocouple 44 and an outlet 46. The thermocouple is connected to a temperature control unit 48 and supplies heat to the heating coil 40 through conduit 50. Leach liquor 52 is circulated through the chamber by circulation pumps 54 through lines 56,58. A copper mass 60 is present in the chamber and immersed in the leach liquor to enable the dissolution to occur. The system is also provided with a pH control 62 connected to a gravity controller 64 into which carbon dioxide is admitted from tank 66. Carbon dioxide off-gas is directed through line 46 to a carbon dioxide scrubber 68. Carbon dioxide from the scrubber 68 is the fed to chamber 70 containing MEA and water which is pumped via pump 72 to chamber 34. The system also comprises an oxidation chamber 74 into which oxygen is admitted via line 76. Product enters at line 78 and following oxidation exits via line 80 and is transferred to product storage.

EXAMPLES

Examples of the process according to the present invention will now be described.

Example 1

Batch Preparation of Monoethanolamine Complex of Copper Carbonate

Monoethanolamine complex of copper carbonate solutions were prepared by dissolving a copper metal mass in monoethanolamine/$CO_2$/$H_2O$ solution in the batch dissolver in the presence of air sparging and at an elevated temperature. FIG. 1 shows a conventional batch dissolver used for the batch-wise operation.

Three experiments were conducted using the batch dissolver shown in FIG. 1. In each experiment, about 1200 g copper and 1 liter MEA-$CO_2$—$H_2O$ solution were charged into the dissolver. The circulation pump, airflow and temperature controller were then started. The experimental conditions are given in Table 3.

TABLE 3

| | MEA-$H_2O$—$CO_2$ Solution | | | | |
|---|---|---|---|---|---|
| Exp ID | MEA/$H_2O$[1] | % $CO_2$ | Sp.G | Air Flow SCFH | Temperature °C. | Circulation Rate ml/min |
| 1 | 0.900/1.00 | 13.7 | 1.165 | 6.0 | 51 ± 1 | 182 |
| 2 | 0.733/1.00 | 14.1 | 1.160 | 6.0 | 51 ± 1 | 182 |
| 3 | 0.900/1.00 | 13.7 | 1.165 | 6.0 | 76 ± 1 | 182 |

[1]weight ratio

Figure 2:
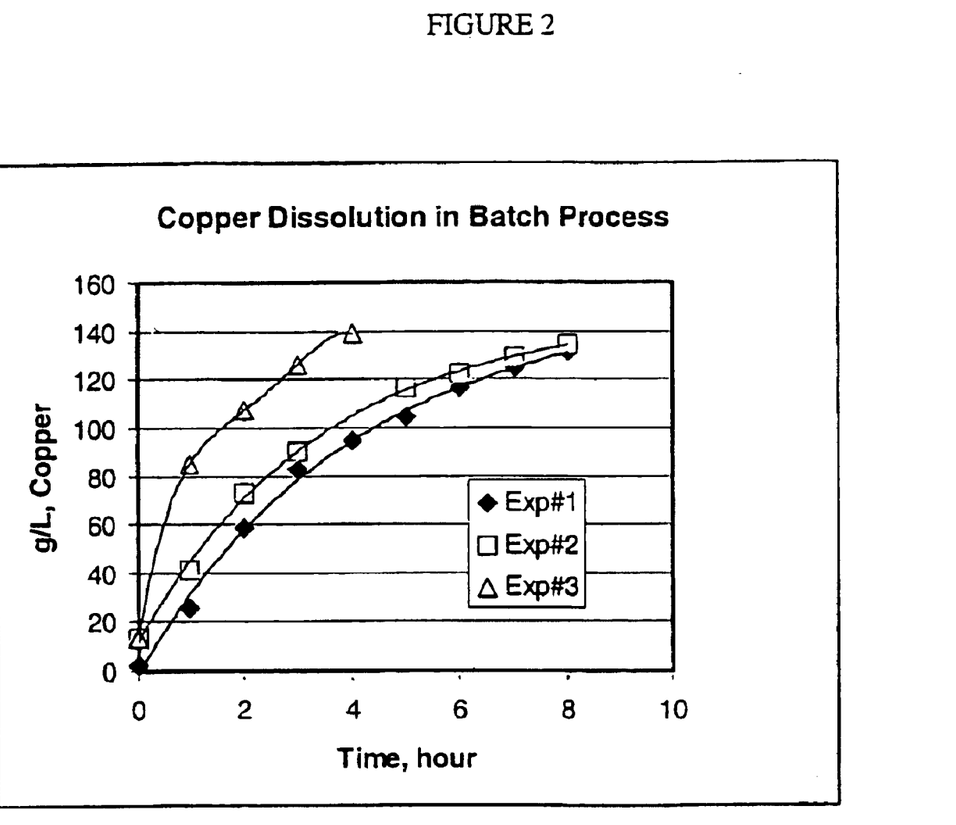
FIG. 2 is a plot showing the copper dissolution in the batch process.
Figure 3:
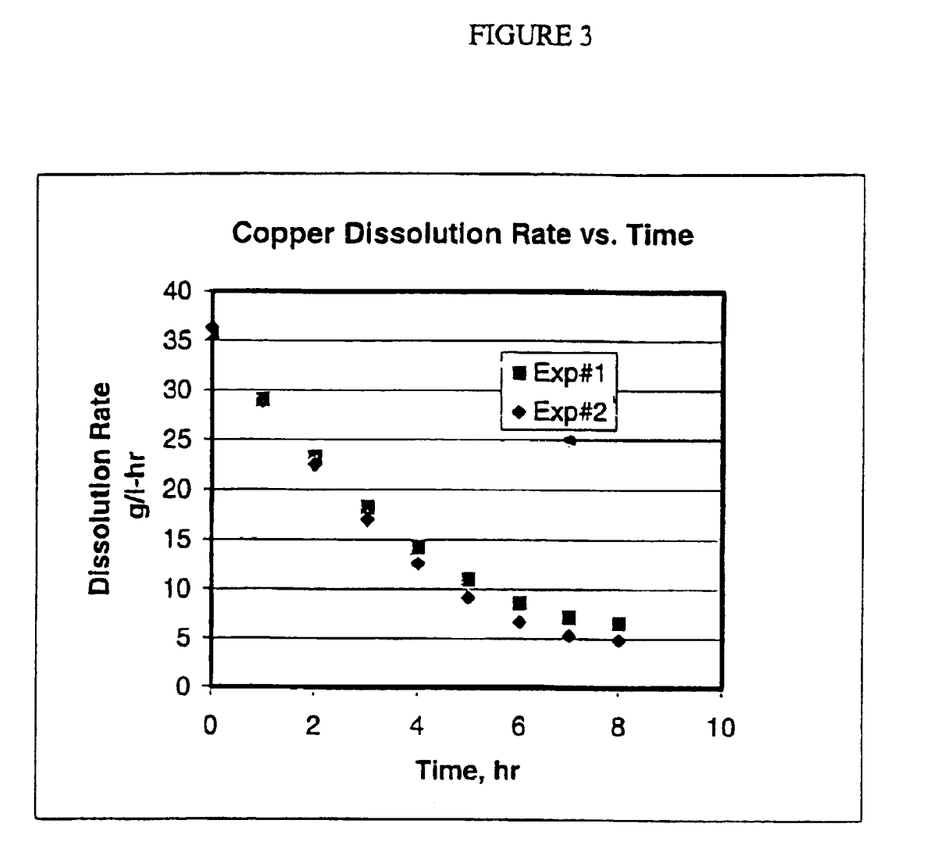
FIG. 3 is a plot showing the copper dissolution rate as a function of time.

When temperature reached the target temperature, the first sample of each batch was taken for analysis, and the timer was started. Complete results of these three dissolving batches are shown below, and are presented in FIGS. 2 and 3. FIG. 2 is a plot showing the copper dissolution in the batch process, and FIG. 3 is a plot showing the copper dissolution rate as a function of time.

TABLE 4

Batch Dissolving - Experiment #1

| Time, hour | % Cu | PH | Sp.G. | Copper, g/L |
|---|---|---|---|---|
| 0 | 0.16 | 8.8 | 1.165 | 1.9 |
| 1 | 2.155 | 9.6 | 1.175 | 25.3 |
| 2 | 4.85 | N/a | 1.205 | 58.4 |
| 3 | 6.73 | 9.45 | 1.228 | 82.6 |
| 4 | 7.66 | 9.6 | 1.239 | 94.9 |
| 5 | 8.36 | 9.6 | 1.251 | 104.5 |
| 6 | 9.23 | 9.6 | 1.262 | 116.5 |
| 7 | 9.79 | N/a | 1.271 | 124.4 |
| 8 | 10.32 | 9.65 | 1.277 | 131.8 |

TABLE 5

Batch Dissolving - Experiment #2

| Time, hour | % Cu | PH | Sp.G. | Copper, g/L |
|---|---|---|---|---|
| 0 | 1.17 | 9.00 | 1.170 | 13.7 |
| 1 | 3.5 | 9.25 | 1.180 | 41.3 |
| 2 | 6.07 | 9.30 | 1.204 | 73.1 |
| 3 | 7.37 | 9.37 | 1.223 | 90.1 |
| 4 | | | | |
| 5 | 9.29 | 9.55 | 1.250 | 116.1 |
| 6 | 9.76 | 9.65 | 1.258 | 122.7 |
| 7 | 10.23 | 9.65 | 1.265 | 129.4 |
| 8 | 10.63 | 9.65 | 1.267 | 134.7 |

TABLE 6

Batch Dissolving - Experiment #3

| Time, hour | % Cu | Ph | Sp.G. | Copper, g/L |
|---|---|---|---|---|
| 0 | 1.175 | 9.45 | 1.175 | 13.8 |
| 1 | 7.054 | 9.80 | 1.208 | 85.2 |
| 2 | 8.661 | 10.0 | 1.237 | 107.1 |
| 3 | 10.11 | 10.2 | 1.251 | 126.4 |
| 4 | 10.99 | 10.3 | 1.267 | 139.2 |

Example 2

Figure 5:
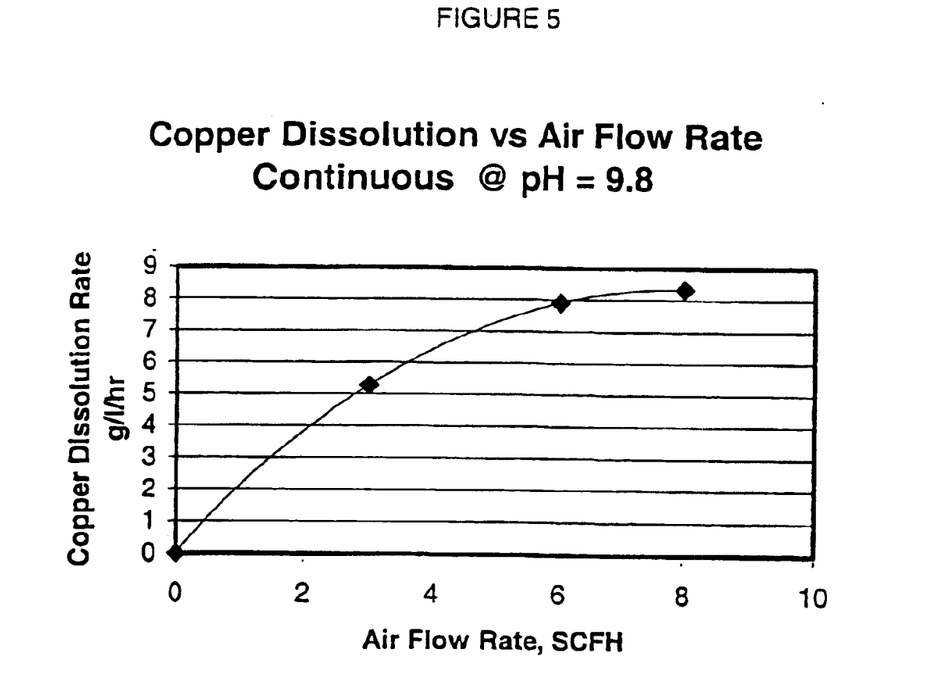
FIG. 5 is a plot showing the copper dissolution rate versus air flow rate in a continuous process at pH 9.8.
Figure 6:
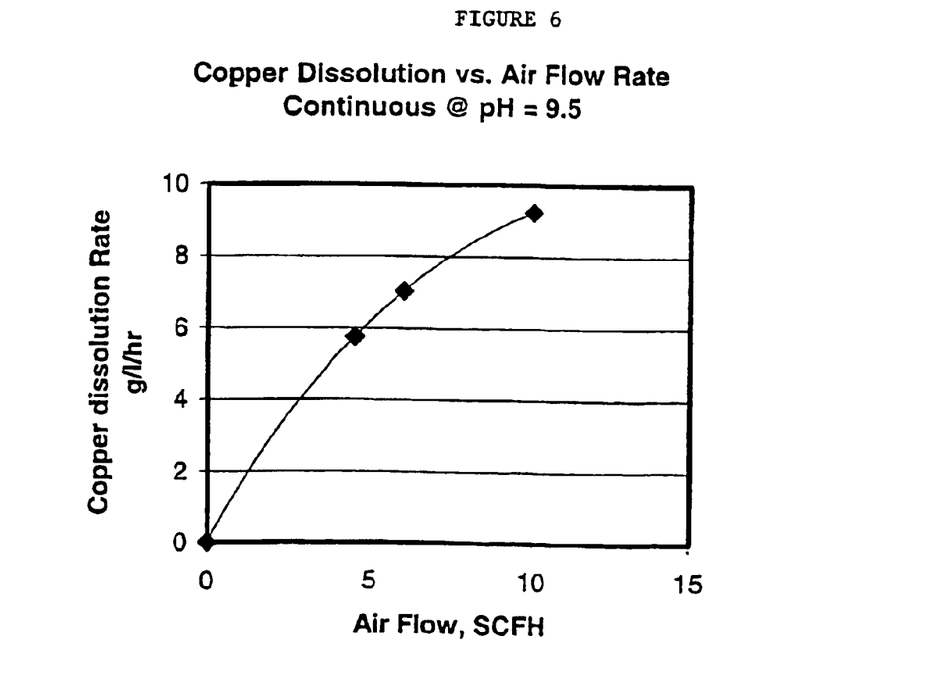
FIG. 6 is a plot showing the copper dissolution rate versus air flow rate in a continuous process at pH 9.5.
Figure 7:
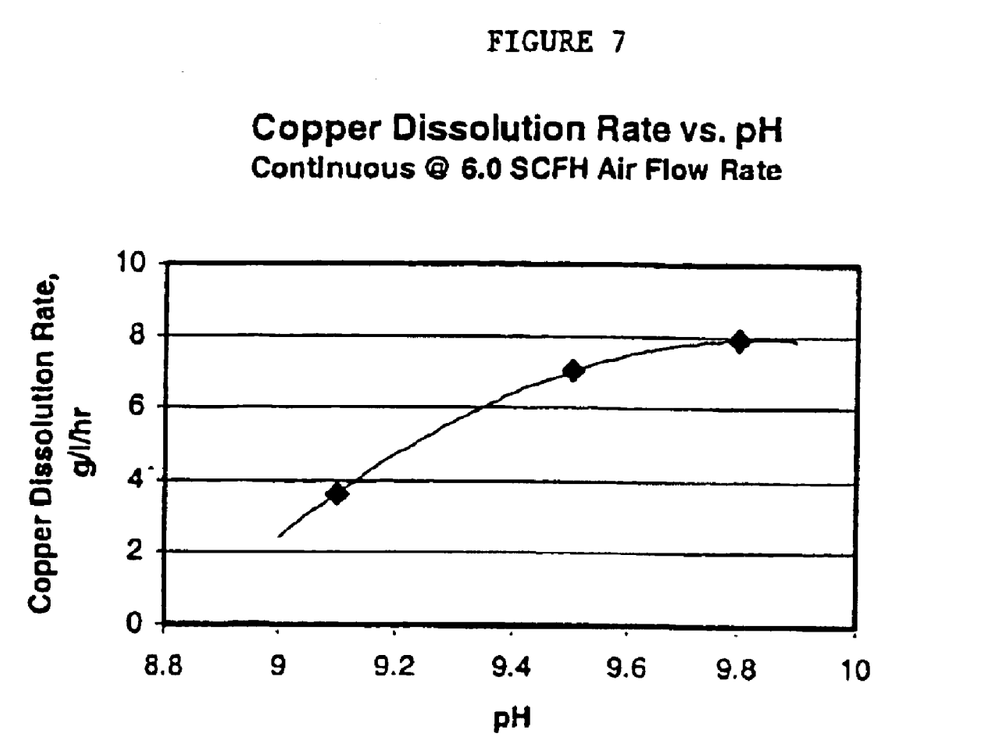
FIG. 7 is a plot showing the copper dissolution rate as a function of pH.

A continuous dissolver assembly (see FIG. 4) was used in the experiments described below. The assembly includes a one-liter size packed-tower dissolver (used in the batch dissolving experiments described above); a gravity controller, a temperature controller, a pH monitor, an air flow meter, a circulation pump and a pump for simultaneous withdraw and replenish of solutions. The gravity controller held about 1 liter of the product solution. The solution in the assembly was circulated between the gravity controller and the dissolver at a constant rate of 325 ml/min. Occasionally, $CO_2$ gas was bubbled through the bottom of the gravity control chamber to adjust the pH of the solution. In all experiments described below, the reaction temperature and specific gravity were controlled at 50±2° C. and 1.271±0.001 g/ml, respectively. During a continuous dissolving experiment, copper is continuously dissolved and results in a gradual increase of the specific gravity of the copper-containing solution. When the gravity reaches a pre-set value, i.e. 1.272, it triggers a pump to withdraw the product solution and replenish MEA-CO2 solution simultaneously. The composition of the MEA-CO2 solution used in all continuous dissolving experiments is the same as that of Exp#1 of the batch process (Table 3). The dissolver was charged on a daily basis with 1" pieces of 11–13 AWG scrap copper wires and maintained a total copper loading of 1100–1200 grams at any given period of the experiments. Results are shown below in Table 7 along with the experimental conditions used, and are also presented in FIGS. 5–7. FIG. 5 is a plot showing the copper dissolution rate versus air flow rate in a continuous process at pH 9.8, FIG. 6 is a plot showing the copper dissolution rate versus air flow rate in a continuous process at pH 9.5 and FIG. 7 is a plot showing the copper dissolution rate as a function of pH.

TABLE 7

Conditions and Results of Continuous Dissolving Experiments

| Duration | | | MEA-Cu—$CO_2$ Solution | | Copper |
|---|---|---|---|---|---|
| Hour | pH | SCFH | Volume, ml | Copper, % | Dissolution g/l/hr |
| 2.13 | 9.8 | 6.0 | 125 | 10.61 | 7.91 |
| 2.13 | 9.8 | 3.0 | 85 | 10.41 | 5.28 |
| 0.65 | 9.8 | 8.0 | 41 | 10.41 | 8.35 |
| 3.35 | 9.5 | 6.0 | 183 | 10.15 | 7.05 |
| 0.64 | 9.5 | 10.0 | 46 | 10.15 | 9.27 |
| 0.78 | 9.5 | 4.5 | 35 | 10.15 | 5.79 |
| 4.1 | 9.1 | 6.0 | 123 | 9.575 | 3.65 |

Figure 8:
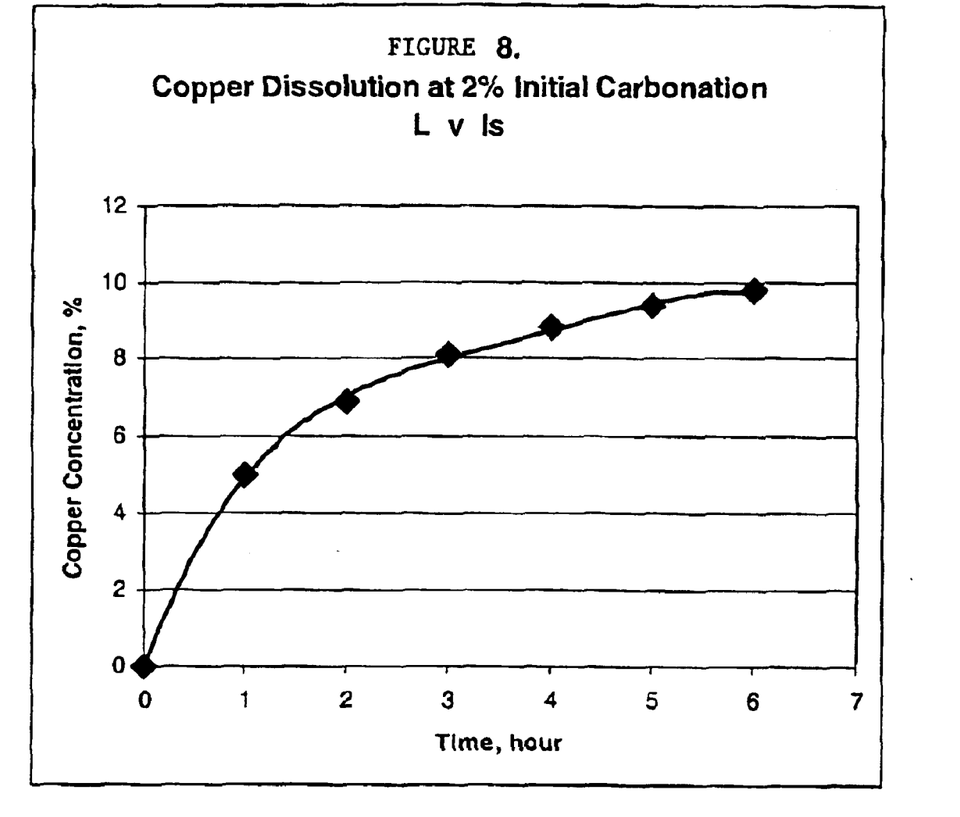
FIG. 8 is a plot showing the copper dissolution in the batch process at relatively low (2%) initial carbonation levels.

A leach solution using 2% (also one data point for 1% carbonation) carbonation is reported in Table 8 and shown in FIG. 8.

TABLE 8

Summary of Experimental Conditions:

| | | Leach Solution | | | |
|---|---|---|---|---|---|
| EXP. # | ID | Amine, % | $CO_2$, % | Volume, ml | Cu Charge, g |
| 1 | MEA-$CO_2$ soln | 39 | 2.0 | 800 | 1250 |
| 2 | MEA-$CO_2$ soln | 39 | 1.0 | 800 | 1250 |

TABLE 8-continued

Copper Concentrations (%) as a Function of Dissolution Time:

| | Dissolution Time, hour | | | | | |
|---|---|---|---|---|---|---|
| EXP. # | 1 | 2 | 3 | 4 | 5 | 6 |
| 1 | 5.0 | 6.9 | 8.1 | 8.8 | 9.4 | 9.8 |
| 2 | 4.9 | | | | | |

Example 3

Production Scale Batch Preparation of Monoethanolamine Complex of Copper Carbonate Commercial quantities of monoethanolamine complex of copper carbonate solutions have been prepared by dissolving a copper metal mass in monoethanolamine/$CO_2$/$H_2O$ solution in an 11,500 gal vessel in the presence of air sparging at an elevated temperature. FIG. 1, the laboratory scale equipment, also conceptually represents the production scale vessel with only two notable exceptions.

Whereas the laboratory scale vessel is glass, the production scale vessel is constructed of a suitable, corrosion resistant material.

Whereas the laboratory vessel is depicted with a heating mantle, there is a heat exchanger in the recirculation loop in the production equipment that has both heating and cooling capability. Normally, only cooling is required as the simultaneous absorption of $CO_2$ and dissolution of copper metal are both exothermic events.

While the leachate solution can be prepared in situ or external to the dissolving vessel, it has normally been prepared in situ. In the preparation of the leachate, the initial amount of $CO_2$ has been varied to demonstrate the threshold value from which a sustained reaction can be initiated. The quantity of air introduced below the perforated false bottom has been varied to demonstrate the overall and peak dissolution rates. Peak dissolution rates and overall dissolution rates are obviously dependent upon the reaction temperature, the initial and final wt % $CO_2$. It should be noted that the conditions examined herein are constrained only by the combination of an upper temperature, the area of the heat exchanger, the temperature and flow rate of the cooling tower water for the existing facility. Obviously, faster conversion rates could be attained given additional heat removal capacity so as to maintain the desired temperature. The rate of recirculation through the heat exchanger has been constant at $\frac{1}{30}^{th}$ of the active volume of the vessel. The pH range is somewhat pre-determined by the amount of MEA present, the amount of initial $CO_2$ present, the final amount of $CO_2$ added, and the degree of conversion from copper metal to complexed copper. The specific gravity has remained relatively constant.

Numerous batches have been produced reflecting a range of operating parameters:

| Parameter | Minimum | Maximum |
|---|---|---|
| Batch Size in liters | 20,500 | 28,400 |
| Initial $CO_2$ in wt % in leachate | 2.1% | 18.0% |
| Aeration Rate in SCF/Sq Ft of X-sectional area | 2.25 | 5.10 |
| Temperature range in deg C. | 18 | 68 |
| Initial pH range | 10.2 | 12.7 |

-continued

| Parameter | Minimum | Maximum |
|---|---|---|
| Range of average dissolution rates in g/l–h | 8.3 | 17.9 |
| Specific Gravity | 1.250 | 1.268 |

Specific batches offered for reference:

| Batch # | Volume | Initial CO$_2$ | Aeration | PH range | Sp Gr | Average Dissolution rate g/l-hr |
|---|---|---|---|---|---|---|
| 10-107-01 | 20,500 | 8.0% | 5.10 | 12.7 to 10.2 | 1.268 | 8.3 |
| 11-107-01 | 20,500 | 18.0% | 5.10 | 11.2 to 10.2 | 1.260 | 15.6 |
| 11-107-02 | 20,500 | 4.2% | 5.10 | 11.9, const | 1.261 | 16.3 |
| 12-107-01 | 20,500 | 4.2% | 2.25 | 11.9, const | 1.250 | 14.3 |
| 12-107-02 | 20,500 | 2.1% | 2.25 | 12.2 to 11.7 | 1.251 | 17.9 |
| 01-107-03 | 28,400 | 2.1% | 2.25 | 12.1 to 11.0 | 1.256 | 11.2 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for producing a copper-containing aqueous solution, comprising dissolving a copper mass in the presence of an oxidant in an aqueous leach liquor containing monoethanolamine and monoethanolammonium carbonate (HMEA)$_2$CO$_3$, and maintaining the pH of the aqueous leach liquor between 8 and 13, wherein said aqueous leach liquor is produced by partially carbonating the monoethanolamine, the aqueous leach liquor comprises about 30% and about 45% by weight of total monoethanolamine, and wherein the aqueous leach liquor dissolves between 100 grams and 130 grams of copper per liter of aqueous leach liquor in 48 hours or less.

2. The process according to claim 1, wherein said oxidant is selected from the group consisting of air, oxygen, or mixture thereof.

3. A process according to claim 1, wherein the process is carried out at a temperature of 25–100° C.

4. A process according to claim 1, wherein the process is carried out at a temperature of 40–80° C.

5. A process according to claim 1, wherein said temperature is 45–55° C.

6. The process according to claim 1, wherein the step of dissolving comprises circulating the aqueous leach liquor through the copper mass with a circulation pump, wherein the copper mass is a three dimensional open network that is permeable to the leach liquor.

7. The process according to claim 6, wherein said circulating is carried out at a rate of about 2 to about 10% of the volume of the leach solution per minute.

8. A process according to claim 1, wherein the reaction is represented by the following equation:

$$Cu+3.5MEA+(1-x)CO_2+0.5O_2+xH_2 \rightarrow Cu(MEA)_{3.5}(CO_3)_{(1-x)}(OH)_{2x}.$$

9. The process according to claim 1, wherein said partial carbonating of said the monoethanolamine is according to the following equation:

$$3.5MEA+xCO_2+H2O \rightarrow (3.5-2x)MEA+(HMEA)_{2x}[CO_3],$$

where x is less than or equal to 1.0.

10. A process according to claim 1, wherein partial carbonation is achieved using carbon dioxide.

11. A process according to claim 10, wherein the carbon dioxide is present in an amount of about 0.5–30% by weight.

12. The process according to claim 1, wherein the pH is 9 to 12.5.

13. The process according to claim 1, wherein the pH is 9.5 to 12.5.

14. A process according to claim 1, wherein ratio of copper surface area to volume of leach liquor is about 200:1.

15. A process according to claim 1, wherein ratio of copper surface area to volume of leach liquor is about 10–20:1.

16. A process according to claim 1, performed as a batch process.

17. A process according to claim 16, wherein the average copper dissolution rate is about 2.5–40 g/l-hour.

18. A process according to claim 16, wherein the average copper dissolution rate is about 8–18 g/l-hour.

19. A process according to claim 1, performed as a continuous process.

20. The process according to claim 1, wherein the carbon dioxide is added in an amount of about 0.5–5% by weight.

21. The process according to claim 1, wherein the carbon dioxide is added in an amount of about 1–18% by weight.

22. A process for producing a copper-containing aqueous solution product, said process comprising:

providing in a packed tower a copper mass having a three dimensional open network permeable to an aqueous solution;

providing an aqueous leach liquor comprising water, monoethanolamine, and (HMEA)$_2$CO$_3$, wherein said aqueous leach liquor is produced by forming an aqueous composition comprising between 0.5% and 30% by weight of carbon dioxide and about 30% and about 45% by weight of monoethanolamine;

providing air, oxygen, or mixture thereof; and contacting the aqueous leach liquor with the air, oxygen, or mixture thereof and with the copper mass, thereby causing dissolution of a portion of the copper mass and forming the copper-containing aqueous solution product, wherein the aqueous leach liquor pH is between 8 and 13 and the temperature is between 25° C. and 100° C., and wherein the aqueous leach liquor dissolves between 100 grams and 130 grams of copper per liter of aqueous leach liquor in 48 hours or less.

23. The process of claim 22, wherein the temperature of the leach liquor is maintained at a temperature between about 40° C. and about 80° C. wherein the leach liquor comprises between of monoethanolamine and between about 1% and 18% by weight of carbon dioxide, and wherein the aqueous leach liquor dissolves between 100 grams and 130 grams of copper per liter of aqueous leach liquor in 12 hours or less.

24. The process of claim 22, wherein the leach liquor comprises between about 32% and about 40% by weight of monoethanolamine and between about 0.5% and about 5% by weight of carbon dioxide.

25. The process of claim 22, wherein the pH of the aqueous leach liquor is between 9 and 12.5.

26. The process of claim 23, wherein the pH of the leach liquor is between 9.5 and 12.5.

27. The process of claim 22, wherein the pH of the leach liquor is between 10.2 and 12.7.

28. The process of claim 22, wherein the pH of the leach liquor is between 11.7 and 12.2.

29. The process of claim 22, wherein the pH of the leach liquor is maintained at about 11.9.

30. The process of claim 23, wherein the temperature is between 45° C. and 65° C. and wherein the aqueous leach liquor dissolves between 100 grams and 130 grams of copper per liter of aqueous leach liquor in 8 hours or less.

31. The process of claim 22, wherein the leach liquor is free of ammonium hydroxide and alkali metal hydroxides.

32. The process of claim 22, wherein the leach liquor is free of polyamines.

33. The process of claim 23, wherein the leach liquor is free of alcohols and carboxylic acids.

34. The process of claim 22, wherein the step of contacting the leach liquor with the copper mass comprises circulating the aqueous leach liquor through the copper mass with a circulation pump, wherein the copper mass is immersed in the leach liquor.

35. The process of claim 34, wherein said circulating comprises withdrawing aqueous leach liquor from a location below the copper mass and reintroducing the withdrawn aqueous leach liquor at a location above the copper mass.

36. The process of claim 34, wherein said circulating is at a rate of about 0.02 to 0.1 of the aqueous leach liquor volume per minute.

37. The process of claim 22, further comprising contacting the aqueous leach liquor with a heat exchanger and removing heat from the aqueous leach liquor.

38. A process for producing a copper-containing aqueous solution comprising:
   providing an aqueous leach liquor comprising water, monoethanolamine, and carbon dioxide, wherein the temperature of the leach liquor is maintained at a temperature between 25° C. and 100° C. and the pH of the leach liquor is between 9 and 12.5;
   providing oxygen; and
   contacting the leach liquor and the oxygen with copper metal, thereby causing dissolution of at least a portion of the copper metal and forming the copper-containing aqueous solution.

39. The process of claim 38, wherein gas comprising molecular oxygen is a mixture of oxygen and air.

40. The process of claim 38, wherein gas comprising molecular oxygen further comprises carbon dioxide.

41. The process of claim 33, wherein the contacting is done in a packed tower having a volume, wherein the step of adding oxygen comprises adding air at a rate of between about 12,000 to about 24,000 standard cubic feet per hour per 11,500 gallons of volume.

42. The process of claim 41, wherein wherein leach liquor is circulated from the bottom of the packed tower to the top of the packed tower.

43. The process of claim 38, wherein the rate of dissolution of copper metal is between about 5 and about 36 grams of copper metal dissolved per liter of leach liquor per hour.

44. The process of claim 38, wherein the rate of dissolution of copper metal is at least 17 grams of copper metal dissolved per liter of leach liquor per hour.

* * * * *